United States Patent

Brandt et al.

[11] Patent Number: 5,725,748
[45] Date of Patent: Mar. 10, 1998

[54] PROCESS AND INSTALLATION FOR TREATING CELLULOSE WASTE LYE

[75] Inventors: Burkhard Brandt, Paderborn; Gerhard Born, Krefeld, both of Germany

[73] Assignee: Chemische Werke Zell-Wildhausen GmbH, Duesseldorf, Germany

[21] Appl. No.: 898,163

[22] Filed: Jul. 22, 1997

Related U.S. Application Data

[63] Continuation of Ser. No. 522,735, Sep. 1, 1995, abandoned, which is a continuation of PCT/DE94/00192, Feb. 24, 1994.

[30] Foreign Application Priority Data

Mar. 1, 1993 [DE] Germany ............................ 43 06 260.1

[51] Int. Cl.⁶ .................................................. B01D 61/44
[52] U.S. Cl. ........................ 205/445; 204/519; 204/530; 204/531; 204/541; 204/544; 204/257; 204/628; 204/630; 204/633; 204/637
[58] Field of Search .......................... 205/445; 204/519, 204/530, 531, 541, 544, 257, 628, 630, 633, 637

[56] References Cited

U.S. PATENT DOCUMENTS

| | | | |
|---|---|---|---|
| 2,354,553 | 7/1944 | Sherk | 204/544 |
| 3,148,177 | 9/1964 | Wiley et al. | 204/544 |
| 4,584,057 | 4/1986 | Rowe et al. | 210/652 |
| 4,775,480 | 10/1988 | Milton et al. | 210/652 |
| 5,334,300 | 8/1994 | Herron et al. | 204/257 |

*Primary Examiner*—Arun S. Phasge
*Attorney, Agent, or Firm*—Herbert L. Lerner; Laurence A. Greenberg

[57] ABSTRACT

In a process for an electrochemical treatment of cellulose waste lye, mass transport takes place through a diaphragm or membrane between a cathode chamber and an anode chamber, and optionally through a middle chamber. Catiogenic components are removed from cellulose waste lye containing lignin sulfonates and being located in at least one of the chambers. Lignin sulfonic acids are produced from the waste lye. In an installation for an electrochemical treatment of cellulose waste lye, at least one diaphragm divides at least one reaction vessel into at least one cathode chamber and at least one anode chamber. At least one cathode electrode is disposed in the at least one cathode chamber, and at least one anode electrode is disposed in the at least one anode chamber. The at least one cathode electrode is formed of iron or aluminum and the at least one anode electrode is formed of special steel, in particular V4A steel. A lignin sulfonic acid of extensively uniform molecular mass distribution and extensively replicable three-dimensional molecular structure and subsequent products recovered from the lignin sulfonic acid are produced by the process and the installation.

40 Claims, 5 Drawing Sheets

PROCESS AND INSTALLATION FOR TREATING CELLULOSE WASTE LYE

CROSS-REFERENCE TO RELATED APPLICATION

This application is a continuation of application Ser. No. 08/522,735, filed on Sep. 1, 1995 now abandoned, which application is a Continuation of International Application Serial No. PCT/DE94/00192, filed Feb. 24, 1994.

BACKGROUND OF THE INVENTION

Field of the Invention

The invention relates to a process and an installation for processing cellulose waste lye as well as to products produced by the process and the installation.

In the production of cellulose, by-products that contain lignin occur in great quantity. In chemical pulping by the sulfite process, sulfite cellulose waste lye occurs, which contains the main mass of the pulping chemicals and the dissolved organic and inorganic wood components. Lignin is present in the sulfite cellulose waste lye in the form of lignin sulfonates.

It should be clearly understood herein that the term cellulose waste lye is traced back historically to the leaching out of wood and makes no statement about adjusting a pH value, or in other words in particular it does not refer to an alkaline medium.

Lignin sulfonates have manifold industrial applications, which are based primarily on their binding and adhesive force on one hand and their dispersing properties on the other hand. Besides the classical use of lignin sulfonates in tanneries and foundries, applications that can be mentioned herein are those in the chemical industry, for instance in the production of adhesives, dyes, agricultural pesticides and fertilizers; in rubber processing; in the production of chipboard; in electroplating technology; in the ceramics industry; as additives to concrete; and as aids in pumping petroleum; and as compacting aids in the production of animal feed. Since the lignin sulfonates are based on wood, which is a renewable raw material, their long-term availability is certain.

Not the least for reasons of environmental protection, sulfite pulping of cellulose is predominantly carried out by the magnesium process, which has largely replaced the calcium process. The magnesium lignin sulfonates which are produced do not always meet the demands made for promising applications. In many technical processes, magnesium is a problem, especially because it tends to form mixed crystals, or its antagonism to calcium makes itself felt. Magnesium lignin sulfonates can also only be converted into commercially usable compounds with great difficulty by chemical processes, such as sedimentation with alkali hydroxides or alkaline earth hydroxides. For instance, if sodium hydroxide is added to a magnesium waste, superfinely dispersed, unfilterable sediments or precipitates are produced. The sediments essentially include magnesium hydroxides, and depending on the type and cooking of the starting material that furnishes the cellulose, they contain a number of compounds of varying composition that settle out under those conditions. The sedimentation is not limited either in quantity or in terms of time. Even weeks later, continued settling is observed. That is the main reason why such waste lyes are limited in their recovery value or value yield. The waste lyes are predominantly inspissated and burned, thus utilizing the high calorific value of the lignin and recovering the process chemicals for the chemical pulping, especially magnesium and sulfur.

It is known from German Published, Non-Prosecuted Application DE-OS 23 31 972 to fractionate sulfite cellulose waste lye by ultrafiltration and ensuing reverse osmosis, or in other words to essentially separate the lignin sulfonates and other components by their molecular mass and concentrate them. Chemical reaction of the problematic magnesium lignin sulfonates does not then occur.

U.S. Pat. No. 4,717,450 describes an electrochemical process in which chloride ions are removed from cellulose waste lye. The waste lye being treated is a sulfate lignin (kraft lignin), which is obtained in an alkaline pulping process and in which lignin is in the form of lignin sulfonates. The waste lye is introduced into the cathode chamber of an electrochemical reactor, in order to extract from it, through an anion exchange membrane, chloride ions that pass into the anode chamber.

The known prior art is accordingly a process for an electrochemical treatment of cellulose waste lye, in which mass transport takes place through a diaphragm or membrane between a cathode chamber and an anode chamber, and optionally through a a middle chamber.

SUMMARY OF THE INVENTION

It is accordingly an object of the invention to provide a process and an installation for preparing cellulose waste lye, which overcome the hereinafore-mentioned disadvantages of the heretofore-known methods and devices of this general type and with which cellulose waste lye containing lignin sulfonates can be prepared on a large scale and economically, in order to make valuable substances with manifold uses and high purity. It is also an object to provide products produced by the process and the installation.

With the foregoing and other objects in view there is provided, in accordance with the invention, in a process for an electrochemical treatment of cellulose waste lye, in which mass transport takes place through a diaphragm or membrane between a cathode chamber and an anode chamber, and optionally through a middle chamber, the improvement which comprises removing cationogenic components from cellulose waste lye containing lignin sulfonates and being located in at least one of the chambers; and producing lignin sulfonic acids from the waste lye.

In the process according to the invention, mass transport takes place through a diaphragm or a membrane. The diaphragm or membrane serves firstly to subdivide the reactor into reaction chambers. This separation is necessary so that the compounds formed during the electrolytic process can no longer be mixed with one another. Secondly, each pore of the diaphragm or membrane represents a mini-reactor, in which an electrical potential develops and as a result compels constitutional changes of organic macromolecules and enables their passage into the other reaction chamber.

With the process according to the invention, lignin sulfonic acids are produced from the cellulose waste lye. The lignin sulfonic acids are furnished replicably, in isolated and highly pure form. They have an extensively uniform molecular mass distribution and an extensively replicable three-dimensional molecular structure. These characteristics can be varied through the use of characteristic process variables of electroosmosis, such as the pore size of the diaphragm and electrical parameters.

The process chemicals used for magnesium chemical pulping, in particular magnesium and sulfur compounds, are recovered in the process of the invention so that they can be resupplied to the pulping process. The lignin sulfonic acids that are obtained can be converted with other agents to make new product families with manifold possible uses. By mixing the lignin sulfonic acids with lyes or carbonates or corresponding transition element compounds, stable lignin sulfonates are obtained, without producing the waste product that is already meant to be disposed of. The pH value of the lignin sulfonates can be adjusted stably within a range between 2 and 14. The class of materials of the lignin sulfonates, which are commercially usable and which are furnished in adequate quantity, is thus broadened considerably, and new areas of application of the lignin sulfonates are gained.

In accordance with another mode of the invention, the cationogenic and anionogenic components are removed from the cellulose waste lye. This can be carried out either in one process step or in successive process steps.

In accordance with a further mode of the invention, the process is carried out at a substantially constantly regulated electrical direct current. The equivalent to this is a constant flow of ions through the diaphragm, which can be adjusted in such a way that heating of the diaphragm remains within limits while the mass transfer balance is good. The guide variable for current regulation is the current, and the guided variable is the voltage. At the beginning of the electrochemical process, the voltage is high, in order to attain the requisite electromotive force and to effect an ion transport through the diaphragm rapidly and economically. Once the desired ion flow is reached, the voltage can be lowered. At a constantly regulated current, a voltage profile results that is specific as to type and size of molecule.

In accordance with an added mode of the invention, the process is performed in batch processing or continuously.

In accordance with an additional mode of the invention, in order to control the flow of material in continuous operation, an optical property of a process liquid is detected, in particular its optical density, its color tone or the like. Other measurement techniques are understood to be possible as well, such as a measurement of the electrical conductivity of a process liquid.

With the objects of the invention in view, there is also provided an installation for an electrochemical treatment of cellulose waste lye, comprising at least one reaction vessel; at least one diaphragm or membrane dividing the at least one reaction vessel into at least one cathode chamber and at least one anode chamber and optionally at least one middle chamber; at least one cathode electrode disposed in the at least one cathode chamber, and at least one anode electrode disposed in the at least one anode chamber; and the at least one cathode electrode being formed of iron or aluminum and the at least one anode electrode being formed of special steel and in particular V4A steel, for removing cationogenic components from cellulose waste lye containing lignin sulfonates and being located in at least one of the chambers, and for producing lignin sulfonic acids from the waste lye.

One essential of every electrochemical process is the type and property of electrodes. U.S. Pat. No. 4,717,450 uses a platinum-iridium alloy as the anode and steel as the cathode. Conversely, according to the invention, special steel is used as the anode, and iron or aluminum is used as the cathode.

It is certainly noted that the electrochemical process can also be carried out with electrodes of other materials such as gold or platinum electrodes, which are less preferred from a cost standpoint.

In accordance with another feature of the invention, the diaphragm is formed of sintered ceramic.

In accordance with a further feature of the invention, the reaction vessel has a middle chamber, a waste lye inlet leads to the middle chamber, a cathode chamber and an anode chamber are partitioned off from the middle chamber through the use of one diaphragm each, and water inlets lead to the chambers. The cathode chamber has a liquid drain and the anode chamber has a drain for the lignin sulfonic acids.

A single-stage electrochemical preparation of the cellulose waste lye takes place in the reaction vessel.

In accordance with an added feature of the invention, in an alternative embodiment of a single-stage installation, the reaction vessel is divided by a diaphragm into a cathode chamber and an anode chamber. A waste lye inlet leads to the cathode chamber, and a water inlet leads to the anode chamber. The cathode chamber has a liquid drain, and the anode chamber has a drain for lignin sulfonic acids.

In accordance with an additional, preferred feature of the invention, there is provided a two-stage layout of the installation, having a first reaction vessel with an anode chamber to which a waste lye inlet leads and with a cathode chamber to which a water inlet leads, and the cathode chamber has a liquid drain, and a second reaction vessel with a cathode chamber to which an inlet from an anode chamber drain of the first reaction vessel leads and with an anode chamber to which a water inlet leads, and the anode chamber has a drain for lignin sulfonic acids. The reaction vessels are preferably structurally identical. This permits an inexpensive, modular construction of the installation.

In accordance with yet another feature of the invention, the electrodes are connected to a current source, which furnishes an electrical direct current of regulated constant current intensity.

In accordance with yet a further feature of the invention, there is provided at least one measuring unit with which the electrical conductivity or an optical property of liquid is detectable, for instance its optical density, its color tone or the like, in the electrode chamber of a reaction vessel, in particular in the cathode chamber of the first reaction vessel and the anode chamber of the second reaction vessel. A continuous flow of material through the installation can be controlled on the basis of the measured value of the measuring unit.

In accordance with yet an added feature of the invention, the measurement unit is a light emitter/light receiver unit having a laser diode and a phototransistor.

With the objects of the invention in view, there are additionally provided products and subsequent products produced by the process and the installation.

Other features which are considered as characteristic for the invention are set forth in the appended claims.

Although the invention is illustrated and described herein as embodied in a process and an installation for preparing cellulose waste lye and products produced thereby, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
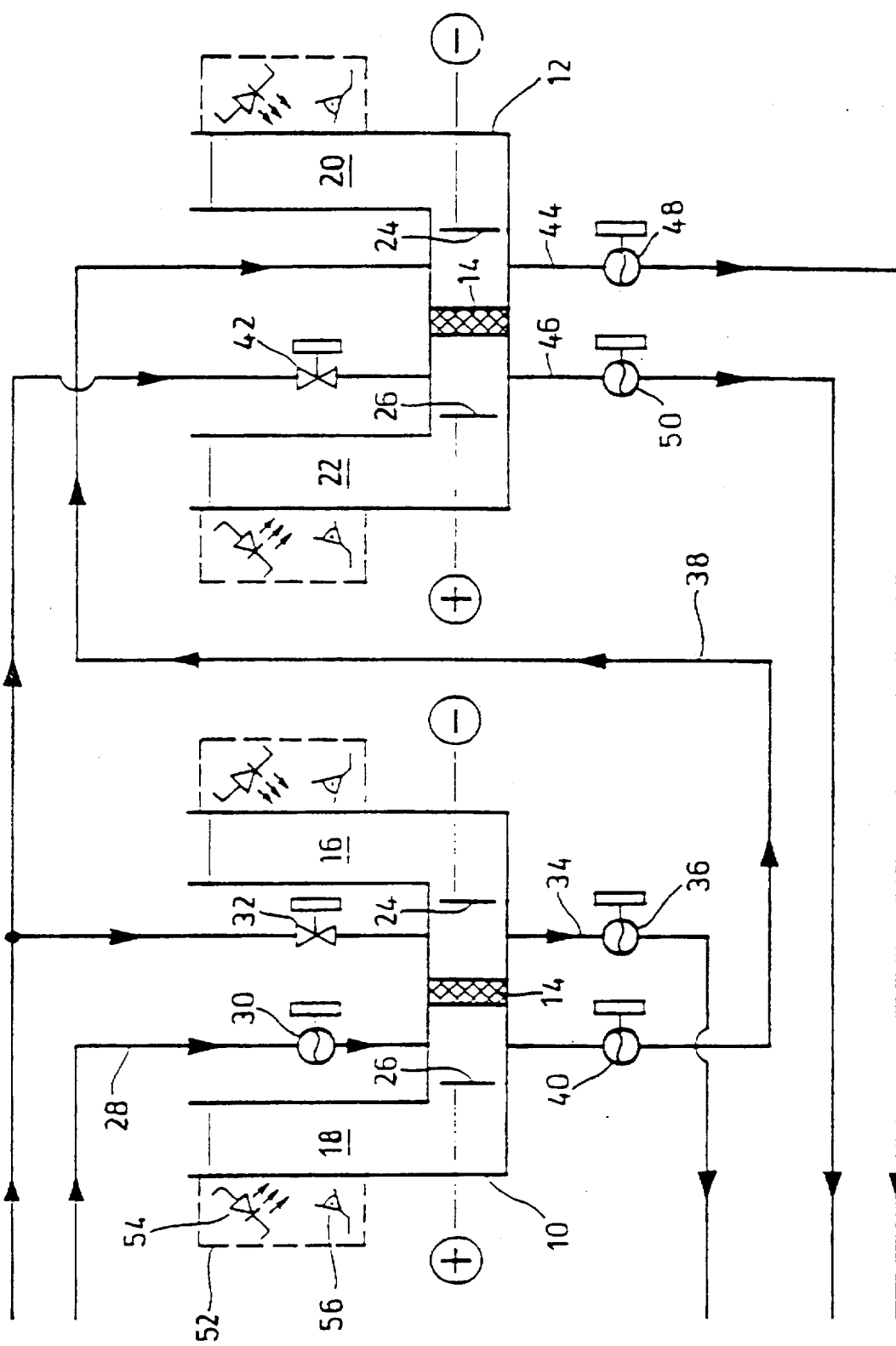
FIG. 1 is a schematic circuit diagram showing a layout of a two-stage installation for preparing cellulose waste lye.

Referring now to the figures of the drawing in detail and first, particularly, to FIG. 1 thereof, there is seen a two-stage installation which includes first and second structurally identical reaction vessels 10, 12, that are subdivided by a diaphragm 14 into a cathode chamber 16, 20 and an anode chamber 18, 22. A cathode 24 of iron or aluminum is located in the cathode chamber 16, 20, and an anode 26 of V4A steel is located in the anode chamber 18, 22. The electrodes 24, 26 are connected to an electrical direct current source.

The anode chamber 18 of the first reaction vessel 10 has an inlet 28, by way of which sulfite cellulose waste lye, of the kind produced in magnesium chemical pulping, for instance, is pumped into the anode chamber 18 through the use of a pump 30. Water is introduced into the cathode chamber 16 of the first reaction vessel 10 through a valve 32. In the first reaction vessel 10, an electrochemical process takes place by which the waste lye is freed of cationogenic components, in particular $Mg^{++}$, which pass through the diaphragm 14 into the cathode chamber.

At the beginning of the electrochemical process, a high voltage must be specified, in order to attain the requisite electromotive force for the ion transport through the diaphragm. The current equivalent is approximately 500 mA greater than the electromotive force of the material to be processed. Ion conduction through the diaphragm 14 entails losses from frictional energy, which cause heating of the diaphragm 14. The ion flow is adjusted in such a way that the energy losses in the diaphragm 14 are kept within limits, and its cooling by the process liquid is adequate, or in other words no expensive additional cooling of the diaphragm 14 is necessary. Once the ion conduction has begun and the desired ion flow is reached, the electrical voltage of the direct current source is regulated in such a way that the electrical direct current is adjusted to a constant current intensity by followup of the voltage.

At the end of the first reaction stage, lignin sulfonic acids, which are still mixed with anionogenic organic components, have formed in the anode chamber 18 of the first reaction vessel 10. These organic components involve sugar fragments, sulfur compounds, components of the uncleaved remaining hemicelluloses, and so forth. Upon reaction with NaOH, the liquid formed in the anode chamber 18 still has sediments, which originate in the anionogenic organic components. Therefore, in the ensuing second reaction stage, the lignin sulfonic acids are isolated from the anionogenic organic components.

Magnesium hydroxide, magnesium sulfate and others are located in the cathode chamber 16 of the first reaction vessel 10. The cathode chamber liquid is recirculated to the chemical pulping process. To that end, the cathode chamber 16 of the first reaction vessel 10 is provided with a drain 34, in which there is a pump 36.

A feed line 38, in which a pump 40 is located, leads from the anode chamber 18 of the first reaction vessel 10 to the cathode chamber 20 of the second reaction vessel 12. The pump 40 pumps anode chamber liquid from the first reaction vessel 10 into the cathode chamber 20 of the second reaction vessel 12. Water is introduced into the anode chamber 22 of the second reaction vessel 12 through a valve 42. Each of the cathode chamber 20 and the anode chamber 22 of the second reaction vessel 12 have a respective drain 44, 46, in which a respective pump 48, 50 is located.

In the second reaction vessel 12, an electrochemical process takes place by which anionogenic components are removed from the cellulose waste lye, and the lignin contained in it is isolated in the form of lignin sulfonic acids. In the cathode chamber 20 of the second reaction vessel 12, the organic compounds, as well as those of the macromolecular lignin sulfo ion, are cleaved, in the process of which they can gain the character approximately of a carbenium ion. The lignin sulfo anion migrates in the anode direction toward the diaphragm 14, which has a well-defined pore diameter. At least certain sulfo anions are unable to pass through the pores, because of their irregular three-dimensional network-like structure. Under the electrochemical "pressure" toward the anode 26, reconfigurations occur at the diaphragm 14, so that a passage through the pores of the diaphragm 14 becomes possible. As a result of the reconfiguration reaction, the reactivity of the lignin system increases, and as a result of that, further purposeful reactions with other agents to make entirely new product families can take place in the installation.

The lignin sulfonic acids are drained from the anode chamber 22 of the second reaction vessel 12 through the drain 46. Evidence of their product quality can be obtained by chromatography. The lignin sulfonic acids do not exhibit any sedimentation on being mixed with NaOH and other precipitation reagents.

The lignin sulfonic acids are stable. They themselves are a commercially viable product of value and can be used as a starting material to produce other products of value.

The organic contaminants that remain behind in the cathode chamber 20 of the second reaction vessel 12 are reduced. The cathode chamber liquid is drained from the reaction vessel 12 through the drain 44. Further processing of the cathode chamber liquid to recover such products as alcohol is possible.

The two-stage electroosmosis described proceeds continuously. In order to control the material flow, the reddish-brown color tone of the process liquids is detected, and specifically the color tone of the cathode chamber liquid in the first reaction vessel 10 and the color tone of the anode chamber liquid in the second reaction vessel 12 in particular.

Light emitter/light receiver units 52, each with a laser diode 54 and a photo transistor 56, are used to detect the color tone. The laser diode 54 shines light at the liquid having a color tone which is to be detected. The wavelength of the light being shone is near an absorption band of the lignin. The phototransistor 56 receives light reflected by the liquid. A rise in lignin concentration in one of the process liquids is detected by a drop in the reflected light intensity, and vice versa. The fill level in the reaction vessels 10, 12 is detected with optocouplers, and the installation is operated automatically with a control unit that is supplied with the measurement signals of the light emitter/light receiver units and the optocoupler and that triggers all of the aforementioned pumps 30, 36, 40, 48, 50 and valves 32, 42.

In a pilot installation, the cathode and anode chambers 16, 18, 20, 22 of the two reaction vessels 10, 12 each hold approximately 500 1. Both reaction vessels 10, 12 are operated at a voltage of between 40 and 350 V with a regulated current of approximately 1.5 A. The installation produces approximately 500 kg of lignin sulfonic acids per hour. In the case of large-scale industrial use, pairs of reaction vessels 10, 12 can be joined into batteries to meet the desired production capacity.

Figure 2:
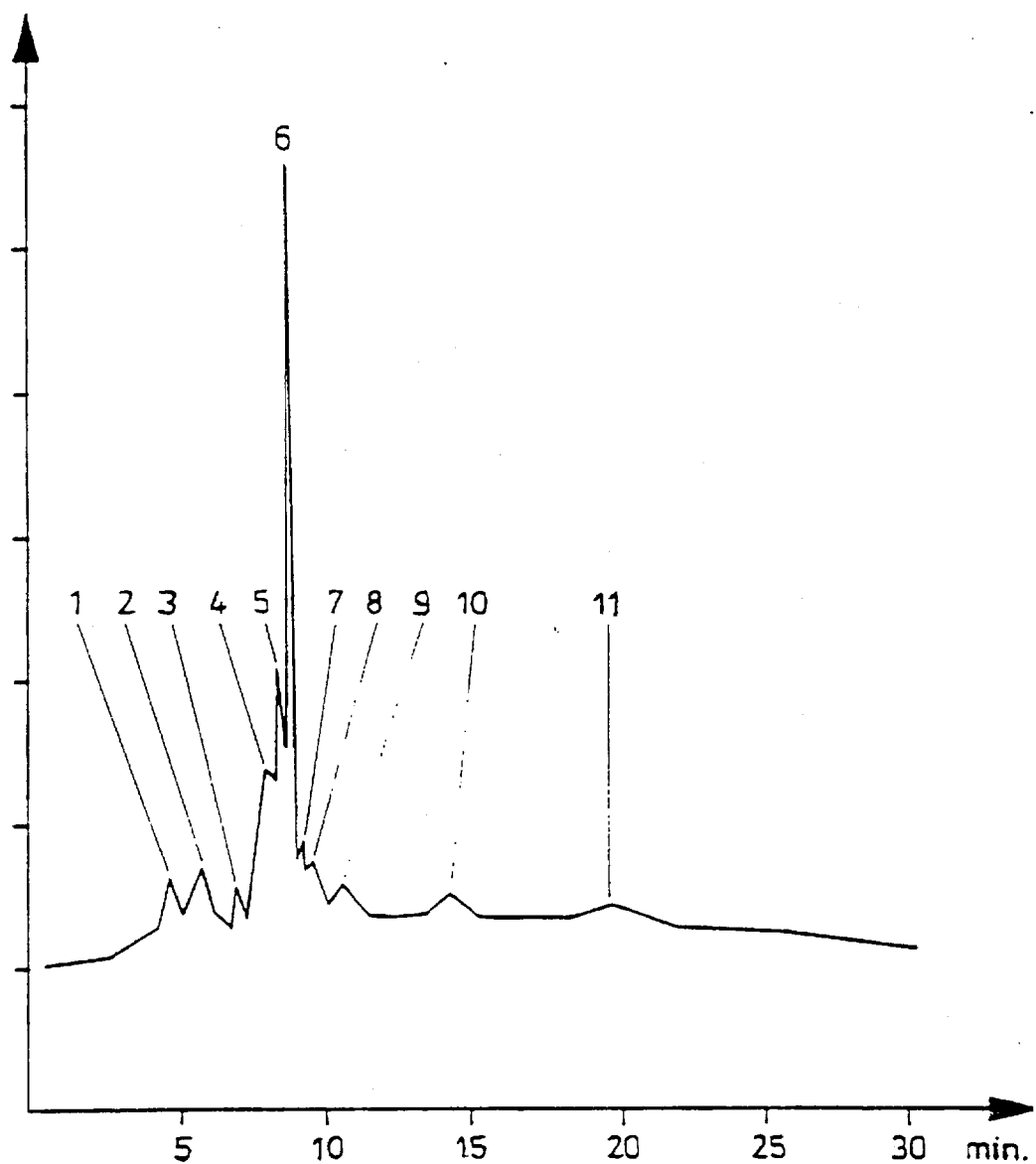
FIG. 2 is a chromatogram of a cellulose waste lye treated in it on an experimental basis.

FIG. 2 is an HPLC/GFC chromatogram (high-pressure liquid chromatography/gel filtration chromatography) of a sulfite cellulose waste lye that has been treated in the installation described. On the linear scale, the molecular mass distribution has been plotted as a function of the retention time. Along with lignin peaks 3, 4, 5, 6, 8, 10 and 11, peaks of numerous contaminants can be seen.

Figure 3:
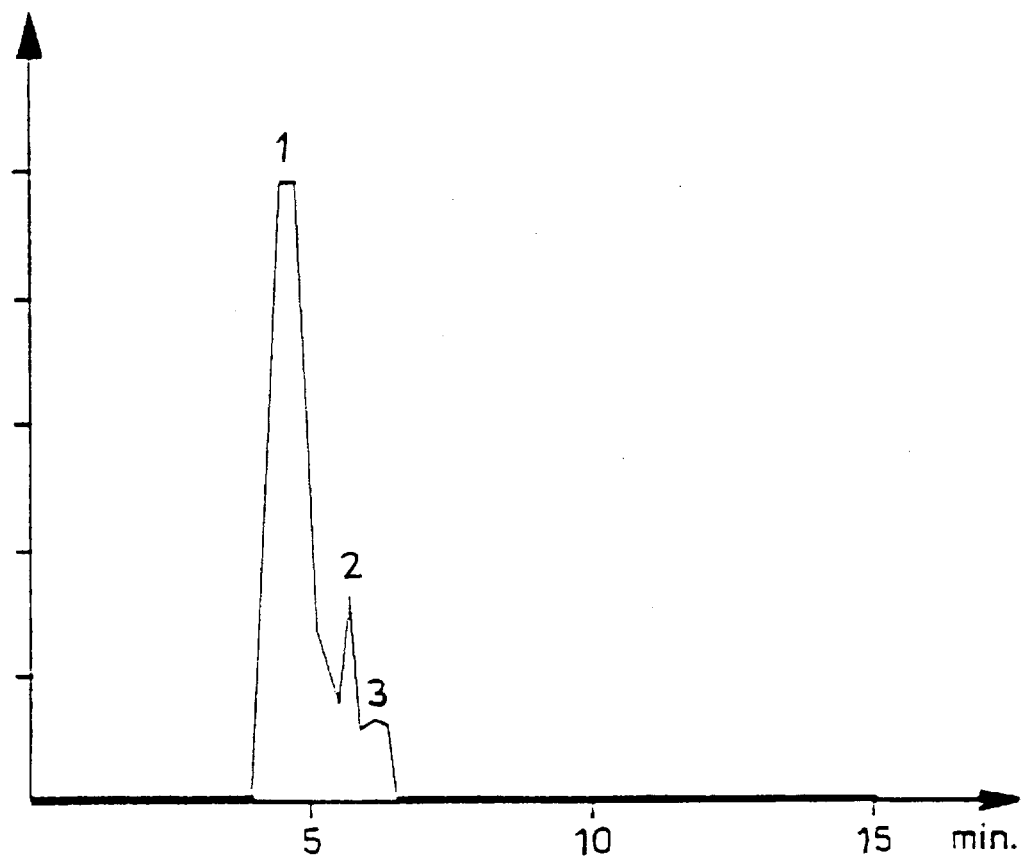
FIG. 3 is a chromatogram of a product obtained thereby.

FIG. 3 is an HPLC/GFC chromatogram of the lignin sulfonic acids that are recovered. In a narrow molecular mass band, three lignin peaks can be seen and practically no contaminants. In other words, this shows a pure molecular mass distribution of the lignin sulfonic acids. Peak 1 represents the greatest and peak 3 the smallest molecular mass of the lignin sulfonic acids. The time scale has been shown shortened. Between 15 minutes and 30 minutes, the course of the chromatogram is equivalent to that between 10 minutes and 15 minutes.

Figure 4:
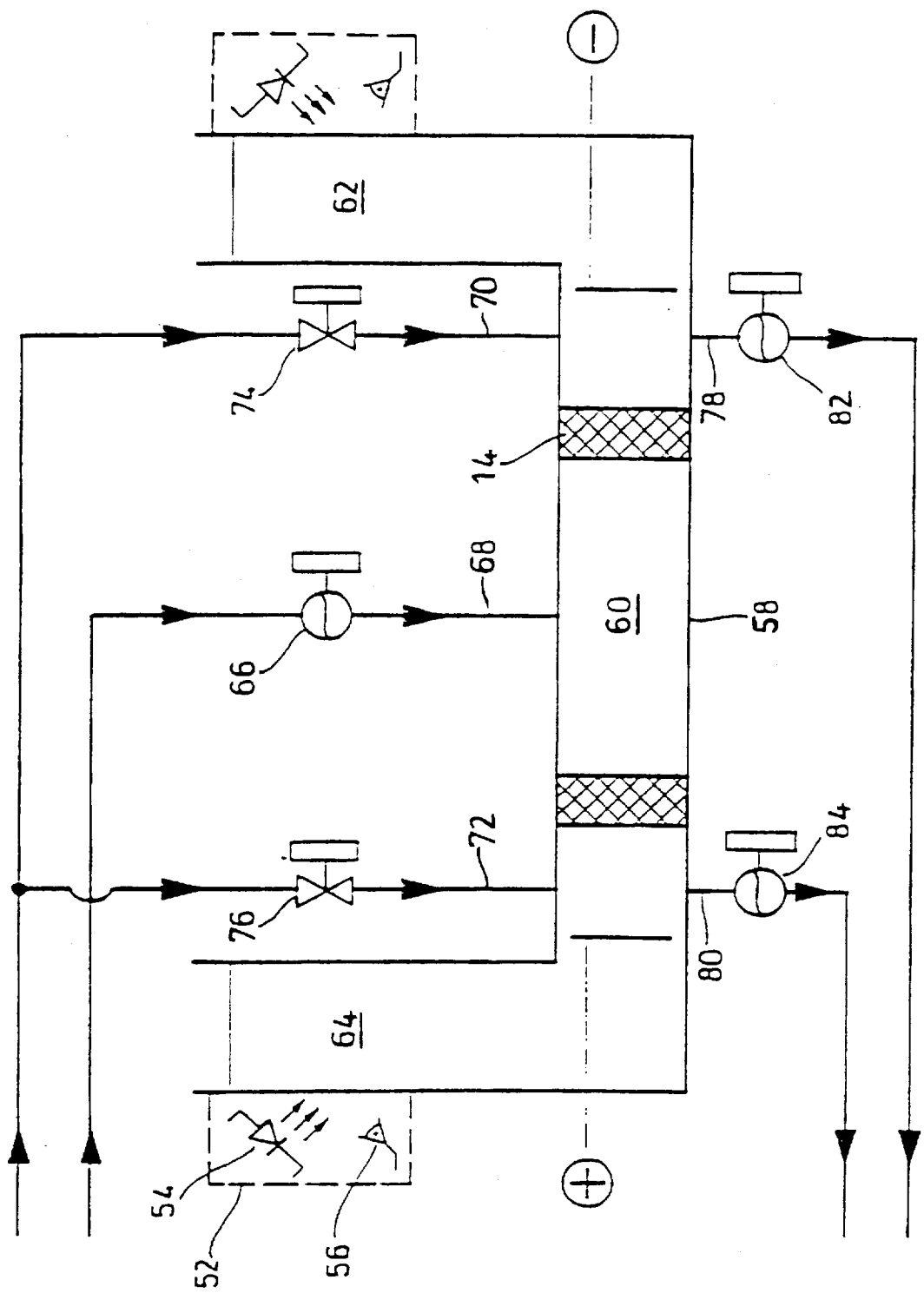
FIG. 4 is a schematic circuit diagram showing a layout of a single-stage installation for preparing cellulose waste lye.

FIG. 4 shows a schematic diagram of an installation with a reaction vessel 58, which has a middle chamber 60 from which a cathode chamber 62 and an anode chamber 64 are partitioned off by respective diaphragms 14. Waste lye from a chemical pulping process is introduced into the middle chamber 60 of the reaction vessel 58 through the use of a pump 66 and an inlet 68. The cathode chamber 62 and the anode chamber 64 each have a respective inlet 70, 72 for water, which is controlled by a respective valve 74, 76, and each has a respective drain 78, 80 for the process liquid, with a respective pump 82, 84 located in it.

Liquid is extracted from the cathode chamber 62 and recycled to the chemical pumping process. Lignin sulfonic acids of high purity are obtained from the anode chamber 64.

Figure 5:
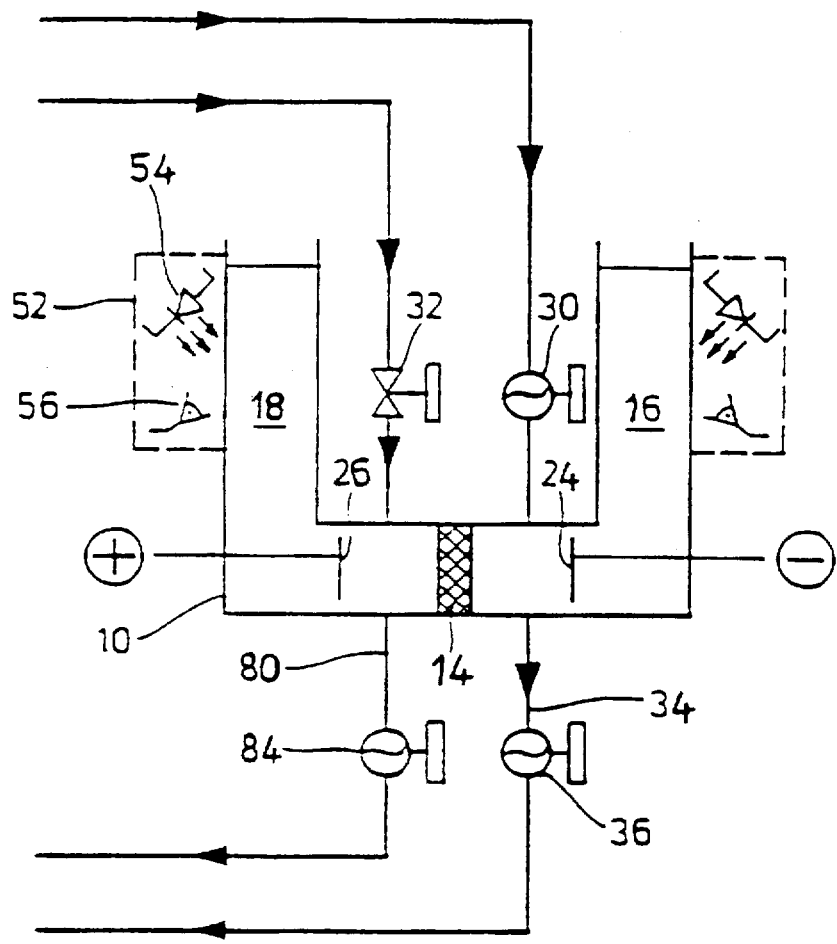
FIG. 5 is a schematic circuit diagram showing a layout of a further single-stage installation.

FIG. 5 shows a schematic diagram of a further installation with a reaction vessel 10 which, like the two reaction vessels 10, 12 of the two-stage system described above, is subdivided by a diaphragm 14 into a cathode chamber 16 and an anode chamber 18.

Non-neutralized dilute lye of the kind that occurs in cellulose production, is pumped into the cathode chamber 16 through the use of a pump 30. Water is introduced into the anode chamber 18 through a valve 32. After the application of a regulated direct current to the electrodes (cathode 24 and anode 26), the lignin sulfonic acids are obtained in the anode chamber 18. The lignin sulfonic acids are drawn off from the anode chamber 18 at a drain 80 through the use of a pump 84. The dilute lye, freed of the lignin sulfo ions, is extracted through a drain 34 with a pump 36 located in it and is replaced with resupplied dilute lye.

The reaction vessel 10 is equivalent in its layout to the two reaction vessels 10, 12 of the two-stage installation. The lignin sulfonic acids obtained in the single-stage preparation process are accompanied by many anionogenic components, such as $SO_2$ after oxidation in the anode chamber 18. In other words, the lignin sulfonic acids are not so pure, nor are they reproducible within such narrow limits of molecular mass distribution, as is the case with the two-stage preparation process. Once again, however, a new product of value is created, with a considerably higher recovery value than that of the starting material.

The electrochemical preparation has been described in detail for sulfite cellulose waste lye from the magnesium pulping process, but it can be employed for waste lyes from other chemical pulping processes as well.

We claim:

1. In a process for producing lignin sulfonic acids by an electrochemical treatment of cellulose waste lye containing lignin sulfonates, in which mass transport takes place through a diaphragm or membrane between a cathode chamber and an anode chamber, and in which cationogenic components are removed from cellulose waste lye containing lignin sulfonates and lignin sulfonic acids are produced from the waste lye, the improvement which comprises:

feeding cellulose waste lye to the anode chamber, feeding water to the cathode chamber, carrying out the electrochemical treatment at a constantly regulated electrical direct current removing the cationogenic components only from cellulose waste lye in the anode chamber and not from the cathode chamber, and isolating stable lignin sulfonic acids from the anode chamber.

2. The process according to claim 1, which further comprises removing anionogenic components from the waste lye.

3. The process according to claim 2, which comprises removing the cationogenic compounds from the waste lye in a first step, and removing the anionogenic components from the waste lye in a second step.

4. The process according to claim 1, which comprises carrying out the electrochemical treatment continuously.

5. A process according to claim 1, further including pH adjustment of lignin sulfonic acids to pH in the range of 2 to 14.

6. A process according to claim 1, in which the constantly regulated electrical current is approximately 1.5 amperes.

7. A process according to claim 1, in which the improvement comprises:

feeding cellulose waste lye to the anode chamber of a first reaction vessel having a diaphragm dividing said reaction vessel into a cathode chamber and an anode chamber;

feeding water to the cathode chamber of said first reaction vessel;

carrying out electrochemical treatment at a constantly regulated electrical direct current; removing cationogenic components only from cellulose waste lye in said anode chamber and not from said cathode chamber;

transferring treated cellulose waste lye containing lignin sulfonic acids from said anion chamber of said first reaction vessel to the cathode chamber of a second reaction vessel having a diaphragm dividing said reaction vessel into a cathode chamber and an anode chamber; feeding water to the anode chamber of said second reaction vessel;

carrying out electrochemical treatment at a constantly regulated electrical direct current, thereby transporting lignin sulfonic acids through said diaphragm into the anode chamber of said second reaction vessel;

and isolating stable lignin sulfonic acids from said anode chamber of said second reaction vessel.

8. A process according to claim 7, in which the stable lignin sulfonic acids exhibit no sedimentation when mixed with sodium hydroxide.

9. A process according to claim 7, which comprises carrying out the electrochemical treatment continuously.

10. A process according to claim 7, comprising controlling the flow of material by detecting electrical conductivity or an optical property of a process liquid.

11. In a process for producing lignin sulfonic acid by an electrochemical treatment of cellulose waste lye containing lignin sulfonates, in which mass transport takes place through a diaphragm or membrane between a cathode chamber and an anode chamber, and in which cationogenic components are removed from cellulose waste lye containing lignin sulfonates and lignin sulfonic acids are produced from the waste lye, the improvement which comprises:

removing the cationogenic components only from cellulose waste lye located in the anode chamber, and controlling the flow of material by detecting electrical conductivity or an optical property of a process liquid.

12. The process according to claim 11, which comprises controlling a flow of material by detecting an optical property of a process liquid.

13. The process according to claim 12, in which the optical property is optical density.

14. An installation for producing lignin sulfonic acids by an electrochemical treatment of cellulose waste lye containing lignin sulfonates, comprising:

at least one reaction vessel;

at least one diaphragm dividing said at least one reaction vessel into at least one cathode chamber and at least one anode chamber;

at least one cathode electrode disposed in said at least one cathode chamber, and at least one anode electrode disposed in said at least one anode chamber;

wherein said electrodes are connected to a current source for furnishing an electrical direct current of regulated, constant current intensity;

a waste lye inlet leading to said at least one anode chamber and a water inlet leading to said at least one cathode chamber, a liquid drain communicating with said at least one cathode chamber, and an outlet communicating with said at least one anode chamber for discharging stable lignin sulfonic acids.

15. The installation according to claim 14, wherein said at least one anode electrode is formed of V4A steel.

16. The installation according to claim 14, wherein said at least one diaphragm is at least one membrane.

17. The installation according to claim 14, wherein said at least one diaphragm is formed of sintered ceramic.

18. The installation according to claim 14, wherein said at least one cathode electrode is formed of a metal selected from the group consisting of iron and aluminum.

19. The installation according to claim 14, wherein said at least one reaction vessel is a first reaction vessel, said at least one anode chamber is a first anode chamber, said at least one cathode chamber is a first cathode chamber, said at least one anode electrode is a first anode electrode, and said cathode electrode is a first cathode electrode, and the installation further including a second reaction vessel, at least one diaphragm or membrane dividing said second reaction vessel into a second cathode chamber and a second anode chamber, a second cathode electrode disposed in said second cathode chamber, and a second anode electrode disposed in said second anode chamber; and wherein said liquid removal conduit communicates with a waste lye feed inlet issuing into said second reaction vessel.

20. The installation according to claim 19, in which said first reaction vessel and said second reaction vessel are structurally identical.

21. An installation for an electrochemical treatment of cellulose waste lye containing lignin sulfonates comprising:

at least one reaction vessel; at least one diaphragm dividing said at least one reaction vessel into at least one cathode chamber and at least one anode chamber;

at least one cathode electrode disposed in said at least one cathode chamber, and at least one anode electrode disposed in said at least one anode chamber;

a waste lye inlet leading to said at least one anode chamber and a water inlet leading to said at least one cathode chamber, a liquid drain communicating with said at least one cathode chamber, and an outlet communicating with said at least one anode chamber for discharging stable lignin sulfonic acids.

22. The installation according to claim 21, wherein the optical property of liquid being detected by said at least one measuring unit is selected from the group consisting of optical density and color tone.

23. The installation according to claim 21, one of said measuring units being disposed in said at least one cathode chamber and another of said measuring units being disposed in said at least one anode chamber.

24. The installation according to claim 21, wherein said at least one measuring unit is a light emitter/light receiver unit having a laser diode and a phototransistor.

25. In a process for producing lignin sulfonic acids by an electrochemical treatment of cellulose waste lye containing lignin sulfonates, in which mass transport takes place through a diaphragm or membrane between a cathode chamber and an anode chamber, and in which anionogenic components are removed from the cellulose waste lye located in the cathode chamber, and lignin sulfonic acids are produced from the waste lye, the improvement which comprises:

feeding cellulose waste lye to the cathode chamber, feeding water to the anode chamber, carrying out the electrochemical treatment at a constantly regulated electrical direct current, and removing the anionogenic components only from the cellulose waste lye located in the cathode chamber and not from the cellulose waste lye located in the anode chamber.

26. The process according to claim 25, which further comprises removing cationogenic components from the waste lye.

27. The process according to claim 25, which comprises removing the anionogenic components from the waste lye in a first step, and removing the cationogenic components from the waste lye in a second step.

28. The process according to claim 25, which comprises carrying out the electrochemical treatment continuously.

29. In a process for producing lignin sulfonic acids by an electrochemical treatment of cellulose waste lye containing lignin sulfonates, in which mass transport takes place through a diaphragm or membrane between a cathode chamber and an anode chamber, and in which anionogenic components are removed from cellulose waste lye containing lignin sulfonates and lignin sulfonic acids are produced from the waste lye, the improvement which comprises:

removing the anionogenic components only from cellulose waste lye located in the cathode chamber, and controlling a flow of material by detecting electrical conductivity or an optical property of a process liquid.

30. The process according to claim 29, which comprises selecting the optical property from the group consisting of optical density and color tone.

31. An improved process for producing lignin sulfonic acids by electro-chemically treating cellulose waste lye containing lignin sulfonates, wherein mass transport is effected through a diaphragm or a membrane, wherein cationogenic and anionogenic components are removed from the cellulose waste lye, and lignin sulfonic acids are produced from the waste lye, the improvement which comprises:

carrying out the electrochemical treatment at a constantly regulated electrical direct current, removing the cationogenic and anionogenic components from cellulose waste lye located in a middle chamber separated from the anode chamber and the cathode chamber, respectively, by a diaphragm or a membrane, and isolating stable lignin sulfonic acids from the middle chamber.

32. The process according to claim 31, which comprises carrying out the electrochemical treatment continuously.

33. An improved process for producing lignin sulfonic acids by electro-chemically treating cellulose waste lye containing lignin sulfonates, wherein mass transport is effected through a diaphragm or a membrane, wherein cationogenic and anionogenic components are removed from the cellulose waste lye, and lignin sulfonic acids are produced from the waste lye, the improvement which comprises:

removing the cationogenic and anionogenic components from cellulose waste lye located in a middle chamber separated from the anode chamber and the cathode chamber, respectively, by a diaphragm or a membrane, controlling a flow of material by detecting electrical conductivity and isolating stable lignin sulfonic acids from the middle chamber.

34. An installation for producing lignin sulfonic acids by an electrochemical treatment of cellulose waste lye containing lignin sulfonates, comprising:

at least one reaction vessel having a middle chamber formed therein;

a diaphragm dividing a cathode chamber from said middle chamber and a diaphragm dividing an anode chamber from said middle chamber;

a cathode electrode disposed in said cathode chamber, and an anode electrode disposed in said anode chamber, wherein said electrodes are connected to a current source for furnishing an electrical direct current of regulated constant current intensity; and water inlets leading into said anode and cathode chambers, a liquid drain communicating with said cathode chamber and a liquid acid drain for isolating lignin sulfonic acids communicating with said anode chamber.

35. The installation according to claim 34, wherein said anode electrode is formed of V4A steel.

36. The installation according to claim 34, wherein said cathode electrode is formed of a metal selected from the group consisting of iron and aluminum.

37. The installation according to claim 34, wherein said diaphragms are membranes.

38. The installation according to claim 34, wherein said diaphragms are formed of sintered ceramic.

39. An installation for producing lignin sulfonic acids by an electrochemical treatment of cellulose waste lye containing lignin sulfonates, comprising:

at least one reaction vessel having a middle chamber formed therein;

a diaphragm dividing a cathode chamber from said middle chamber and a diaphragm dividing an anode chamber from said middle chamber;

a cathode electrode disposed in said cathode chamber, and an anode electrode disposed in said anode chamber, water inlets leading into said anode and cathode chambers, a liquid drain communicating with said cathode chamber and a liquid acid drain communicating with said anode chamber and including at least one measuring unit disposed in at least one of said chambers for detecting a parameter selected from the group consisting of electrical conductivity and an optical property of liquid.

40. The installation according to claim 39, wherein the optical property of liquid being detected by said at least one measuring unit is selected from the group consisting of optical density and color tone.

* * * * *